Jan. 20, 1959  I. J. WHITE  2,869,478
DOG TRACK LURE MECHANISM
Filed Nov. 9, 1956  2 Sheets-Sheet 1
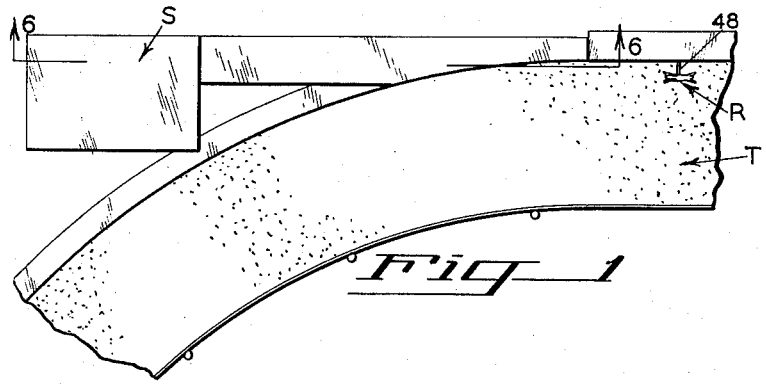
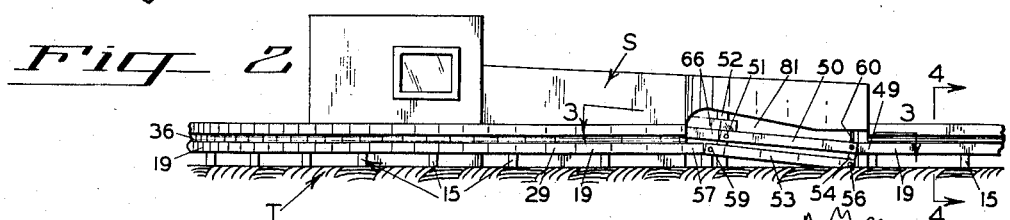
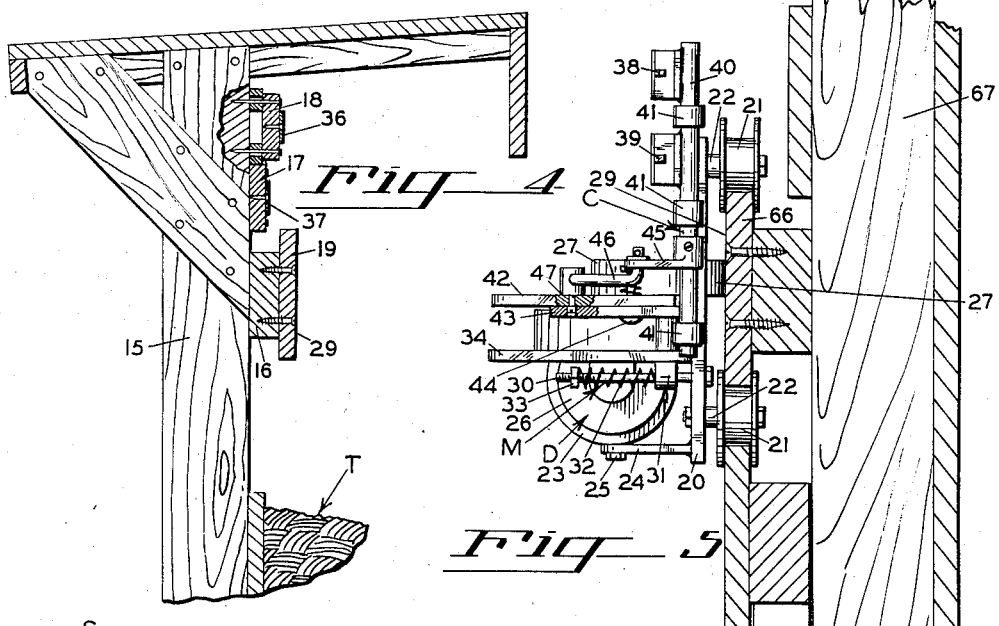
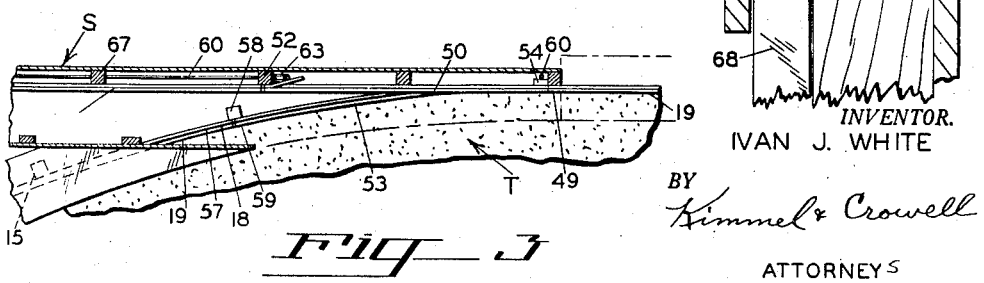
INVENTOR.
IVAN J. WHITE
BY
Kimmel & Crowell
ATTORNEYS

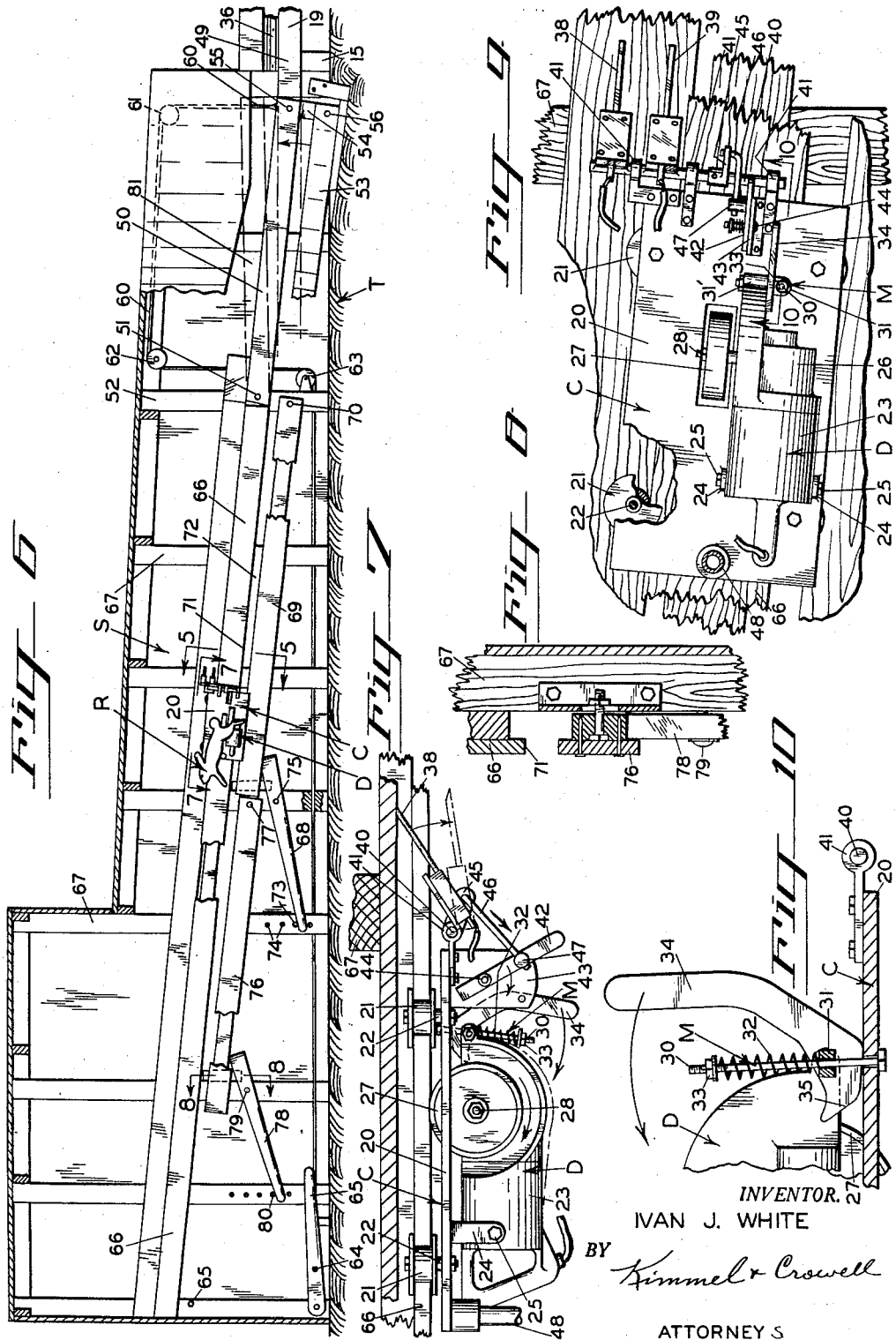

United States Patent Office 2,869,478
Patented Jan. 20, 1959

2,869,478
DOG TRACK LURE MECHANISM
Ivan J. White, Portland, Oreg.
Application November 9, 1956, Serial No. 621,240
1 Claim. (Cl. 104—131)

The present invention relates to an improvement in a dog track lure mechanism, and more particularly to such a mechanism having improved means for facilitating the disappearance of the lure at the end of the race.

The primary object of the invention is to provide means to cause the lure to disappear from the view of the dogs at the end of the race, while allowing the dogs to come to a normal stop without use of a barricade.

Another object of the invention is to provide a lure mechanism having a shunting track which receives the lure carriage and brings the same to a gradual stop beyond the view of the running dogs.

A further object of the invention is to provide a mechanism of the class described above which is inexpensive to manufacture, simple to operate, and effective in action.

Other objects and advantages will become apparent in the following specifications when considered in the light of the attached drawings, in which:

Figure 1 is a fragmentary plan view of a dog race track incorporating the invention.

Figure 2 is a side elevation of the structure shown in Figure 1 partially broken away.

Figure 3 is a fragmentary enlarged sectional view, taken on the line 3—3 of Figure 2, looking in the direction of the arrows.

Figure 4 is an enlarged fragmentary sectional view of the lure carriage track, taken on the line 4—4 of Figure 2, looking in the direction of the arrows.

Figure 5 is a fragmentary enlarged sectional view taken on the line 5—5 of Figure 6, looking in the direction of the arrows.

Figure 6 is a longitudinal fragmentary sectional view taken on the line 6—6 of Figure 1, looking in the direction of the arrows.

Figure 7 is a fragmentary enlarged sectional view taken on the line 7—7 of Figure 6, looking in the direction indicated.

Figure 8 is an enlarged sectional view taken on the line 8—8 of Figure 6, looking in the direction indicated.

Figure 9 is a fragmentary enlarged side view of the lure carriage and track structure with the lure removed from the carriage.

Figure 10 is an enlarged fragmentary bottom plan view of one of the controls shown partially in section.

Referring now to the drawings in detail wherein like reference characters indicate like parts throughout the several figures, the reference character T indicates generally a race track of the type commonly used in dog races.

The race track T is provided along the outer periphery thereof with vertical posts 15. The posts 15 support horizontally disposed railings 16, 17 and 18 completely around the track T. Secured to the face of the railing 16 is a track 19 which supports a power driven lure carriage C.

The lure carriage C consists of a base 20 having flanged rollers 21 journalled thereto by stub shafts 22 secured to the base 20. The flanged rollers 21 embrace the track 19, as best illustrated in Figures 5 and 7.

Pivotally mounted to the base 20 of the carriage C is a driving unit D. The driving unit D includes an electric motor 23 pivotally mounted on the base 20 by forks 24 welded to the base 20 and having their outer ends connected by pivot bolts 25 to the frame of the electric motor D, as best illustrated in Figures 5, 7 and 9.

The motor 23 is provided with a gear reduction head 26, arranged to drive a friction wheel 27 through a drive shaft 28 extending from the gear head 26. The outer periphery of the friction wheel 27 engages the face 29 of the track 19 and moves the carriage C along the track 19 in the operation of the lure.

The friction wheel 27 is caused to engage the face of the track 19 by the action of an adjustable tension mechanism M. Referring now particularly to Figures 5 and 10, the tension mechanism M includes a bolt 30, anchored to the base 20. The bolt 30 passes through an eye-bolt 31 which is rotatably journalled through a boss 31' of the driving unit D. A spring 32 bears against the eye-bolt 31 and under an adjustable nut 33 threaded to the bolt 30. The spring 32 pushes the driving unit D towards the base 20 at all times, causing the friction wheel 27 to engage the face of the track 19 with an adjustable pressure.

Referring now particularly to Figure 10, a lever 34 is pivotally journalled on the eye-bolt 31 between the boss 31' and the head of the eye-bolt 31. The lever 34 has a cam surface 35 to engage the face of the base 29 when it is desired to disengage the friction wheel 27 from the surface of the track 19. When the lever 34 is in the position shown in Figure 10, the friction wheel 27 engages the face of the track 19, but when moved in the direction of the arrow the cam surface 35 will engage the base 20 of the carriage C moving the friction wheel 27 away from the surface of the track 19.

The electric motor 23 receives its electrical energy for driving the same from metallic bus bars 36 and 37 secured to the face of the rails 17 and 18, referring particularly to Figures 2, 4 and 6. The electric bus bars 36 and 37 continue completely around the track T, except for a short distance adjacent the point where the lure R disappears from the track T into a receiving and storage station S, which will be later described.

A pair of electric energy contact brushes 38 and 39 are fixedly secured to a rotatable shaft 40 journalled within supporting bearings 41 mounted to the base 30, as best illustrated in Figures 5, 7 and 9. The shaft 40 is rotated by a hand operated control lever 42 pivotally mounted to a quadrant 43 at 44. Fixedly secured to the shaft 40 is a lever 45. The lever 45 is rotated by the hand control lever 42 through the link connection 46.

The hand control lever 42 is held either in the full line position, referring to Figure 7, or in the broken line position, by a locking mechanism 47. In the full line position, electric energy is delivered from the electric bus bars 36 and 37 through the brushes 38 and 39 and into the motor 23 driving the same.

Referring to Figure 1, the lure or rabbit R is carried by the carriage C by a supporting arm 48, over the track T. The speed of the carriage C over the track 19 is controlled from the control station, not here shown, by controlling the amount of electrical energy available to be delivered to the motor 23 by the bus bars 36 and 37.

I will now describe the shunting and stopping mechanism for the carriage C and the lure R within the storage station S, which is the feature of this invention. When the race has been completed, the lure R is shunted into station S out of sight of the dogs running on the track T, the dogs coming to a slow natural stop. Ordinarily in race tracks a curtain is dropped across the track, causing the dogs to come to a sudden stop, which is not desirable. With this new and improved lure R disappearing feature the lure R disappears and the dogs come to a gradual stop.

Referring to Figures 2, 3 and 6 particularly, the track 19 terminates at the point 49. Beyond this point into the station S is a straight-on section of switch track 50, its inner end being pivotally mounted at 51 to the upright support 52, while its opposite end is pivotally connected to a second switch track 53 by a cross member 54, the tracks 50 and 53 being pivotally connected to this member at 55 and 56. The opposite end of the switch track 53 is curved so as to join the end 57 of the track 19, the same being pivotally mounted thereto at 59.

The cross member 54, together with the tracks 50 and 53 are supported at their free ends by a cable 60, which is trained over the sheaves 61, 62 and 63 and connected at 64 to the lever 65. When the lever 65 is in the position shown in Figure 6, the switch track 53 will be out of alignment with the track 19 and the switch track 50 will be in alignment with the track 19. The carriage C will move over the switch track 50 onto the track 66 fixedly carried by the uprights 67 within the station S.

As the carriage C travels over the track 66, the lever 68 is moved so as to move a bar 69 about its pivot 70 towards the lower edge 71 of the track 66 establishing a converging elongated V-shaped area 72 through which the lower flanged rollers 21 pass with the area 72 gradually decreasing so that the bar 69 and track 66 will increasingly bear against the rollers 21 retarding the forward movement of the carriage C over the track 66. The lever 68 can be adjusted to any position and held in this position by pins 73 positioned in holes 74 within the upright 67. The lever 68 is journalled by pivot 75 to the upright 67.

A second braking bar 76 is pivotally mounted at 77 to one of the uprights 67 and is operated by a lever 78 pivotally mounted at 79 to an upright 67 and held in any desired adjusted position by a holding pin 80. The braking bar 76 further retards the forward movement of the carriage C in the event that the first braking bar 69 does not completely stop the forward movement of the carriage C. By the use of one or more braking bars 69 and 76, a very fine accurate adjustment can be made so that the carriage C will stop in the desired position.

The carriage C enters the station S through an elongated opening 81 formed in the side of the station wall, referring particularly to Figure 2. As the carriage C passes the opening 81 the lure R is carried out of sight of the dogs running on the track.

I will now describe the operation of this new and improved dog track lure mechanism. The levers 68 and 78 are released, permitting the braking bars 69 and 76 to move away from the lower edge 71 of the track 66. This permits the carriage C and the lure R to move by gravity backwards down over the inclined track 66 by releasing the friction against the flanged rollers 21, permitting the carriage C to travel down over the switch track 50 and onto the main track 19.

When the carriage C has been positioned on the main line track 19, the lever 65 is moved to a vertical position and secured behind the holding pin 65'. This raises the cross member 54, including the outer ends of the switch rails 50 and 53 by pulling the cable 60, raising the rail 50 to the broken line position, at the same time placing the switch rail 53 in alignment with the main rail 19. The operator then can move the carriage C over the switch rail 53 onto the end 19' of the rail 19, then by switching the lever 42 to the position shown in Figure 7 he can cause the contact of the brushes 38 and 39 with the bus bars 36 and 37 so that the motor 23 will circle the track 19 when electric energy is turned on through the bus bars 36 and 37 by remote control, not here shown. The carriage C then will be driven by the friction wheel 27 and the motor 23 around the track T. When the operator moves the switch rails 50 and 53 to the position shown in Figure 6, the carriage C will travel over the switch rail 50 onto the track 66 into the braking mechanism above described.

When the carriage C leaves the bus bars 36 and 37, the electrical energy will naturally automatically cease to reach the motor 23. The carriage C can be stopped at any point around the track T by turning off the electrical supply to the bus bars 36 and 37.

Another way to start the lure R on its way after reaching the switch track 50 and onto the main track 19 is to permit the carriage C to coast a short distance along the track 19, then by the contact of the brushes 38 and 39 with the bus bars 36 and 37, the carriage C will be given a start sufficient to carry the same over the switch track 53 back into contact with the bus bars 36 and 37 driving the lure R around the dog track T.

Having thus described the preferred embodiment of the invention, it should be understood that numerous structural modifications and adaptations may be resorted to without departing from the scope of the appended claim.

What is claimed is:

A lure receiving and hiding station for lures used on oval dog race tracks of the type having an encompassing lure supporting track wherein the lure is of the electrically propelled type and the track is of the type having electrical conductors thereon which supply electrical energy to the lures for propelling the same around the track comprising a closed housing, a side track fixedly disposed within said housing and arranged in longitudinally aligned tangential relation with a straight portion of said lure supporting track adjacent a curved end portion of said lure track, said side track extending upwardly at an inclined angle from said straight portion of said lure supporting track for assisting in stopping said lure and for returning said lure by gravity to said lure track, a switch track located intermediate said side track and said lure track, said switch track comprising a first section of track having one end thereof pivoted to said side track on a horizontal axis transverse to said side track and a second section of track having one end thereof pivoted to the curved portion of said lure track on a horizontal axis transverse to said lure track, a cross member extending between and pivotally connected to the other end of said first named track section and the other end of said second named track section, control means connected to said cross member for selectively aligning said first named track section and said second named track section of said switch with said side track and said lure track respectively, and adjustable braking means adjacent said side track to retard the movement of a lure thereover, said adjustable braking means comprising an elongated brake member arranged in spaced substantially parallel relation beneath said side track, transverse means pivotally supporting the end of said brake means adjacent said lure track and hand adjustable means connected to said brake for varying the spacing between said side track and the end of said brake member opposite said pivotal supporting means.

References Cited in the file of this patent

UNITED STATES PATENTS

| | | |
|---|---|---|
| 1,386,496 | Hassler | Aug. 2, 1921 |
| 1,399,972 | Liddicoat | Dec. 13, 1921 |
| 1,656,298 | Smith | Jan. 17, 1928 |
| 1,881,328 | Read | Oct. 4, 1932 |
| 1,866,767 | Guertin | July 12, 1932 |
| 1,961,997 | Bacon | June 5, 1934 |
| 1,981,678 | Staver | Nov. 20, 1934 |